United States Patent
Halperin et al.

(10) Patent No.: US 7,436,953 B2
(45) Date of Patent: Oct. 14, 2008

(54) HACKING PREVENTION SYSTEM

(75) Inventors: Victor Halperin, Maaleh Adumim (IL); Yossi Tsuria, Jerusalem (IL); Yaacov Belenky, Maaleh Adumim (IL); Dov Falik, Haifa (IL); Yaron Sella, Jerusalem (IL)

(73) Assignee: NDS Limited, Staines Middlesex (GB)

( * ) Notice: Subject to any disclaimer, the term of this patent is extended or adjusted under 35 U.S.C. 154(b) by 692 days.

(21) Appl. No.: 10/480,413

(22) PCT Filed: Aug. 21, 2002

(86) PCT No.: PCT/IL02/00691

§ 371 (c)(1),
(2), (4) Date: Jun. 15, 2004

(87) PCT Pub. No.: WO03/024104

PCT Pub. Date: Mar. 20, 2003

(65) Prior Publication Data

US 2004/0213406 A1    Oct. 28, 2004

Related U.S. Application Data

(60) Provisional application No. 60/322,053, filed on Sep. 13, 2001, provisional application No. 60/382,488, filed on May 22, 2002.

(51) Int. Cl.
*H04L 9/00* (2006.01)
(52) U.S. Cl. .................................... 380/28; 726/9
(58) Field of Classification Search .................. None
See application file for complete search history.

(56) References Cited

U.S. PATENT DOCUMENTS

| | | | |
|---|---|---|---|
| 5,282,249 A | 1/1994 | Cohen et al. | |
| 5,481,609 A | 1/1996 | Cohen et al. | |
| 5,590,200 A | 12/1996 | Nachman et al. | |
| 5,991,415 A * | 11/1999 | Shamir | 380/30 |
| 6,079,018 A * | 6/2000 | Hardy et al. | 713/170 |
| 6,178,242 B1 | 1/2001 | Tsuria | |
| 6,385,317 B1 | 5/2002 | Rix et al. | |
| 6,459,791 B1 | 10/2002 | M'Raihi et al. | |
| 6,694,436 B1 * | 2/2004 | Audebert | 726/9 |
| 2002/0126844 A1 | 9/2002 | Rix et al. | |

FOREIGN PATENT DOCUMENTS

| | | |
|---|---|---|
| AU | 199935297 B2 | 5/1999 |
| WO | 97/38530 | 10/1997 |
| WO | 97/47110 | 12/1997 |
| WO | WO 99/57901 | 11/1999 |

OTHER PUBLICATIONS

English translation of WO 97/47110 dated Dec. 11, 1997.

* cited by examiner

*Primary Examiner*—Pramila Parthasarathy
(74) *Attorney, Agent, or Firm*—Ladas & Parry LLP

(57) ABSTRACT

A method for producing an output from an input encoding the output, the method including choosing functions G, F, and H, providing an input x, choosing a random number r, computing x'=G(x, r), sending x' to a computation unit, computing, in the computation unit, y'=F(x'), receiving y' from the computation unit, and computing the output w=H(y', r), wherein G, F, and H are chosen such that w is not dependent on the choice or r. Related apparatus and methods are also described.

53 Claims, 2 Drawing Sheets

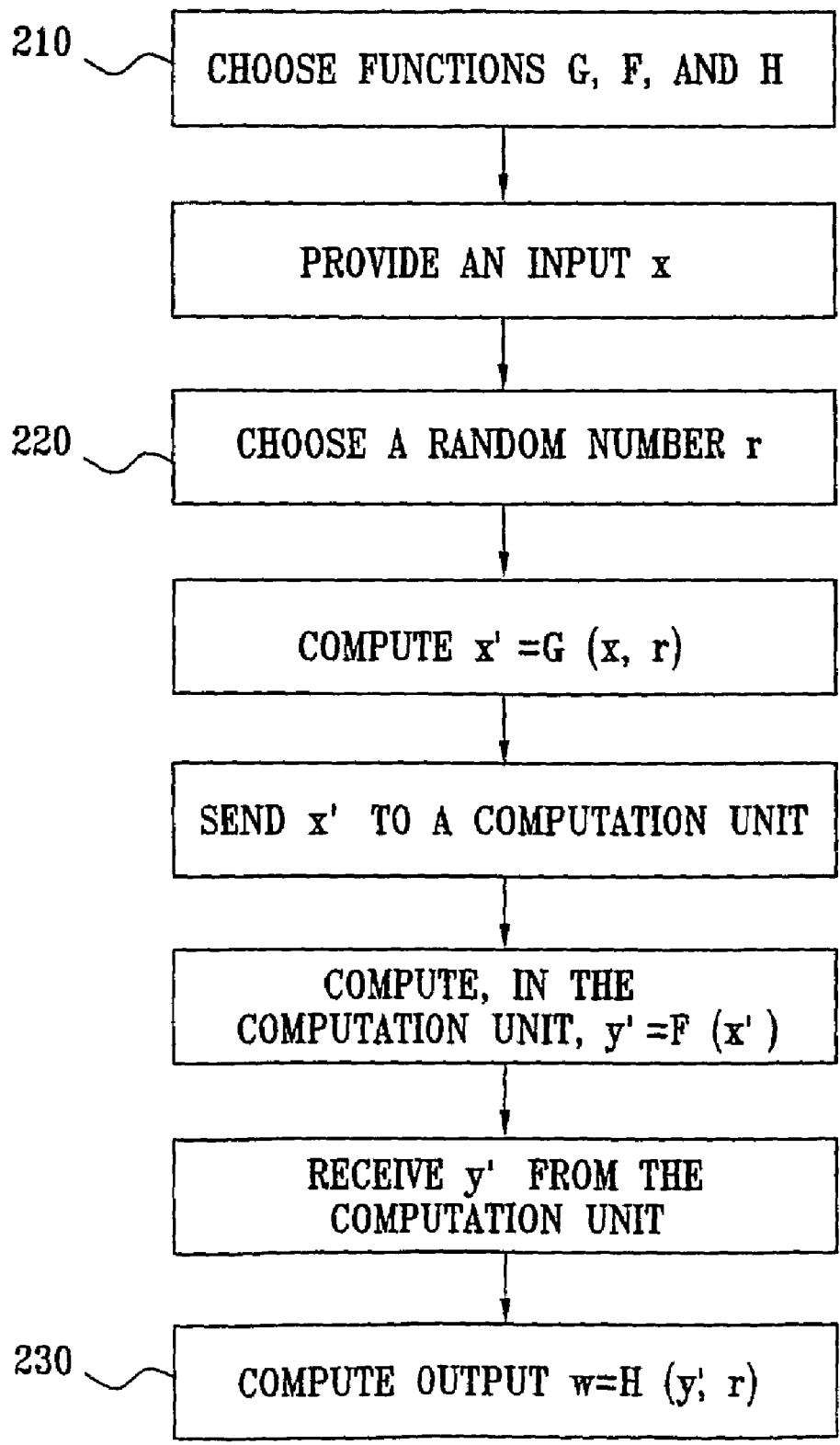

HACKING PREVENTION SYSTEM

The present application is a 35 USC §371 application of PCT/IL02/00691, filed on 21 Aug. 2002 and entitled "Hacking Prevention System", which was published on 20 Mar. 2003 in the English language with International Publication Number WO 03/024104 A1, and which relies for priority on U.S. Provisional Patent Application No. 60/322,053 filed 13 Sep. 2001 and on U.S. Provisional Patent Application Ser. No. 60/382,488, filed on 22 May 2002, claims the benefit thereof and incorporates the same by reference.

FIELD OF THE INVENTION

The present invention relates to apparatus and methods for preventing unauthorized access to secured communications, particularly but not exclusively to apparatus and methods for preventing unauthorized access to secured communications in conditional access systems.

BACKGROUND OF THE INVENTION

In systems that include secure communications, including conditional access systems as are well known in the art, there is a well-known problem of "hackers" who attempt to access secured communications in an unauthorized manner.

One particular hacker attack and a system for frustrating such a hacker attack is described in U.S. Pat. No. 5,590,200 to Nachman et al, the disclosure of which is hereby incorporated herein by reference. The disclosures of all references referred to in U.S. Pat. No. 5,590,200 are also hereby incorporated herein by reference.

Briefly, the system of Nachman et al is intended to frustrate a particular type of hacker attack known as "the McCormac hack". In the particular context of conditional access systems for television in which the McCormac hack was developed, the McCormac attack may be understood as follows.

Prior art systems typically include an ICAM (Integrated Conditional Access Module), typically comprised in a set top box (STB), in communication with a security element such as a smart card. (It is appreciated that some prior art systems may perform similar functions without having an ICAM). In prior art systems, as is well known in the art, the ICAM receives an Entitlement Control Message (ECM), typically but not necessarily by broadcast. The ECM includes information necessary to generate a Control Word (CW) used for descrambling content such as broadcast content. The ICAM passes the ECM to a secure computation unit, typically comprising a removable security element such as a smart card, where the ECM is processed, typically using a secret cryptographic function, to obtain the CW. The smart card then passes the CW back to the ICAM, which in turn passes the CW to other components of the STB for use in descrambling the content. Typical prior art systems are described in U.S. Pat. Nos. 5,282,249 and 5,481,609 to Cohen et al and in U.S. Pat. No. 6,178,242 to Tsuria, the disclosures of which are hereby incorporated herein by reference.

It is well known in the prior art that the smart card is specifically designed to return a valid CW only to users who are authorized to view a particular piece of content, or a particular service, associated with the ECM.

Briefly, the McCormac hack comprises a method for listening in to or "sniffing" the communications between the ICAM and the smart card, and in particular for capturing the CW being returned to the ICAM by the smart card. In the McCormac hack, the CW is then broadcast to other set top boxes, including set top boxes which are not authorized to view the content associated with the ECM. While the original McCormac hack was described in terms of radio broadcast of the CW, the inventors of the present invention believe that other distribution methods, including distribution via a network such as the Internet or distribution via local coaxial cable associated with a pay television system, may also be used in the McCormac hack and that these other methods may be more practical and easier to use. Therefore, the inventors of the present invention believe that the McCormac hack may now be a more serious threat than previously supposed.

The system of Nachman et al provides a particular system for frustrating the McCormac hack. The inventors of the present invention believe that there are some drawbacks in the system of Nachman et al. In particular, the system of Nachman et al, if implemented in an existing broadcast system, for example, would require changes in the broadcast headend. Furthermore, the system of Nachman et al would require extra bandwidth, as opposed to earlier prior art systems, in order to send ECMs in accordance with the system of Nachman et al. One example of an earlier prior art system in this context is described in U.S. Pat. Nos. 5,282,249 and 5,481,609 to Cohen et al, mentioned above and incorporated herein by reference.

The following U.S. Provisional Patent Applications, from which the present application claims priority, are hereby incorporated herein by reference:

U.S. Provisional Patent Application Ser. No. 60/322,053 of Halperin et al, filed 13 Sep. 2001; and U.S. Provisional Patent Application Ser. No. 60/382,488 of Halperin et al, filed 22 May 2002.

The disclosures of all references mentioned above and throughout the present specification are hereby incorporated herein by reference.

SUMMARY OF THE INVENTION

The present invention seeks to provide improved apparatus and methods for preventing unauthorized access to secured communications.

In preferred embodiments, the present invention addresses the following scenario:

A first party Alice gets a (typically but not necessarily small) encrypted message and wants to decrypt the message. Alice lacks the tamper-resistant hardware and the secret keys needed for decryption but a second party Bob owns the tamper-resistant hardware and the secret keys. Therefore, Alice needs to send the encrypted message to Bob to decrypt the encrypted message and send the plain text back to Alice. Unfortunately, doing this allows another party Eve to eavesdrop on the communication line conveying the decrypted message (as done, for example, in the well-known "McCormac hack" referred to above). The present invention, in preferred embodiments thereof, provides apparatus and methods to enable Alice to know the decrypted message without needing to use either tamper-resistant hardware or secret keys, and without enabling eavesdropping of the decrypted message.

In the present specification, the example of a broadcast system is used by way of example only, it being appreciated that the system of Nachman et al as well as the present invention may be used in other appropriate types of communication systems. In general, the present invention, in preferred embodiments thereof, can be used to protect secured communications which are restricted in scope, in the sense that not any possible message can be protected; rather, as will be appreciated from the discussion below, messages that can be protected in preferred embodiments of the present invention generally fall within particular categories governed by mathematical equations.

It would be possible to improve the system of Nachman et al by using a secure channel between an ICAM (Integrated Conditional Access Module in a set top box (STB)) and a security element such as a smart card in communication therewith. However, such an approach would require having cryptographic secrets on both sides (for example, using a key exchange algorithm such as the well-known Diffie-Hellman algorithm). For a discussion of relevant cryptographic methods, see for example *Applied Cryptography* by Bruce Schneier, John Wiley, 2nd ed., 1996, the disclosure of which is hereby incorporated herein by reference. In particular, the following portions of *Applied Cryptography* may be of particular interest: for a discussion of key exchange, Section 3.1 (pages 47-52) and Chapter 22 (pages 513-525), including a discussion of the Diffie-Hellman algorithm in Section 22.1 (pages 513-516).

Relevant cryptographic methods are also discussed in Menezes et al, *Handbook of Applied Cryptography*, 1997, the disclosure of which is hereby incorporated herein by reference.

The present invention, in the context of a preferred embodiment relating to the case of an STB and a smart card, may be briefly summarized as follows:

1. The ICAM receives the ECM and performs a randomized cryptographic operation thereon.

2. The processed ECM is sent to the smart card.

3. The smart card operates the smart card's one-way function (as is well known in the art and described, for example, in the Cohen et al patents mentioned above) on the ECM to produce a modified CW and sends the modified CW back to the ICAM. It is appreciated, throughout the present specification, that the example of using a one-way function is believed to be preferred, but that other methods known in the art may also be used.

4. The ICAM performs an "inverse" operation (in a sense, inverse to the randomized cryptographic operation previously performed by the ICAM on the ECM) on the modified CW to obtain the actual CW.

There is thus provided in accordance with a preferred embodiment of the present invention a method for producing an output from an input encoding the output, the method including choosing functions G, F, and H, providing an input x, choosing a random number r, computing $x'=G(x, r)$, sending x' to a computation unit, computing, in the computation unit, $y'=F(x')$, receiving y' from the computation unit, and computing the output $w=H(y', r)$, wherein G, F, and H are chosen such that w is not dependent on the choice of r.

Further in accordance with a preferred embodiment of the present invention the output includes one of the following: a control word (CW), and a decryption key.

Still further in accordance with a preferred embodiment of the present invention the method also includes utilizing the output to decrypt an encrypted message.

Additionally in accordance with a preferred embodiment of the present invention F includes a secret function.

Moreover in accordance with a preferred embodiment of the present invention the choosing a random number r includes choosing a random number r using a random number generator.

Further in accordance with a preferred embodiment of the present invention the random number generator includes a secure random number generator.

Still further in accordance with a preferred embodiment of the present invention the choosing a random number r includes choosing a random number r using a pseudo-random number generator.

Additionally in accordance with a preferred embodiment of the present invention the function G is chosen such that derivation of r from x and G(r, x) is computationally unfeasible.

Moreover in accordance with a preferred embodiment of the present invention the function F is chosen such that, for two inputs $x_1$ and $x_2$, it is computationally unfeasible to compute $F(x_1)$ from $x_1$, $x_2$, and $F(x_2)$.

Further in accordance with a preferred embodiment of the present invention the method also includes choosing a group having a computationally hard discrete logarithm problem, and wherein $G(x, r)=x, g^r$, and $F(x, u)=u^{a(x)}$, and $H(y, r)= y^{1/r \bmod order\ of\ the\ group}$, and a(x) is a secret cryptographic function, and g is a fixed generator of the group, and r is a large secret random integer relatively prime with the order of the group.

Still farther in accordance with a preferred embodiment of the present invention the method also includes providing a large prime number p, choosing a random number r relatively prime with (p-1), and computing $r'=1/r \bmod (p-1)$, and wherein the output w has the form $b^{a(x)} \bmod p$, and a(x) is a secret cryptographic function, and $G(x, r)=(x, b^r \bmod p)$, and $F(x')=u^{a(x)} \bmod p$, where $x'=(x, u)$, and $H(y', r)=y'^{r'} \bmod p$.

Additionally in accordance with a preferred embodiment of the present invention b is a generator of all of 1 . . . p-1.

Moreover in accordance with a preferred embodiment of the present invention b is a generator of a sub-group of 1 . . . p-1, the order of the sub-group being large and prime.

Further in accordance with a preferred embodiment of the present invention the order of the sub-group is greater than $2^{120}$.

Still further in accordance with a preferred embodiment of the present invention the order of the sub-group is greater than $2^{160}$.

Additionally in accordance with a preferred embodiment of the present invention the computation unit includes a secure computation unit.

Moreover in accordance with a preferred embodiment of the present invention the secure computation unit includes a removable security element.

Further in accordance with a preferred embodiment of the present invention the removable security element includes a smart card.

There is also provided in accordance with another preferred embodiment of the present invention a secure system for producing an output from an input x encoding the output, the system including a random number generator choosing a random number r, a randomized operation unit computing $x'=G(x, r)$, a computation unit receiving x' and computing $y'=F(x')$, and an "inverse" randomized operation unit receiving y' from the computation unit and computing the output $w=H(y', r)$, wherein G, F, and H are functions chosen such that w is not dependent on the choice of r.

There is also provide in accordance with another preferred embodiment of the present invention a secure system for producing an output from an input x encoding the output, the system comprising a random number generator choosing a random number r, a randomized operation unit computing $x'=G(x, r)$, an interface adapted to communicate with a computation unit external to the secure system, the computation unit receiving x' and computing $y'=F(x')$, and an "inverse" randomized to operation unit receiving y' from the computation unit and computing the output w=H (y', r), wherein G, F, and H are functions chosen such that w is not dependent on the choice of r.

Further in accordance with a preferred embodiment of the present invention the random number generator, the randomized operation unit, and the "inverse" randomized operation unit are included in an output-production subsystem, and the computation unit is adapted for use with more than one output-production system, and the computation unit is not operable to distinguish between one output-production subsystem and another output-production subsystem.

Still further in accordance with a preferred embodiment of the present invention the random number generator, the randomized operation unit, and the "inverse" randomized operation unit are included in an output-production subsystem, and the computation unit is adapted for use with more than one output-production system, and the computation unit is not operable to determine, based solely on communication with the output-production subsystem, whether the output-production subsystem is entitled to receive output from the computation unit.

Additionally in accordance with a preferred embodiment of the present invention the output includes one of the following a control word (CW), and a decryption key.

Moreover in accordance with a preferred embodiment of the present invention the system also includes a utilization unit utilizing the output to decrypt an encrypted message.

Further in accordance with a preferred embodiment of the present invention F includes a secret function.

Still further in accordance with a preferred embodiment of the present invention the random number generator includes a secure random number generator.

Additionally in accordance with a preferred embodiment of the present invention the random number generator includes a pseudo-random number generator.

Moreover in accordance with a preferred embodiment of the present invention the function G is chosen such that derivation of r from x and G(r, x) is computationally unfeasible.

Further in accordance with a preferred embodiment of the present invention the function F is chosen such that, for two inputs $x_1$ and $x_2$, it is computationally unfeasible to compute $F(x_1)$ from $x_1$, $x_2$, and $F(x_2)$.

Still further in accordance with a preferred embodiment of the present invention a group having a computationally hard discrete logarithm problem is chosen, and $G(x, r)=x$, $g^r$, and $F(x, u)=u^{a(x)}$, and $H(y, r)=y^{1/r \bmod order\ of\ the\ group}$, and $a(x)$ is a secret cryptographic function, and g is a fixed generator of the group, and r is a large secret random integer relatively prime with the order of the group.

Additionally in accordance with a preferred embodiment of the present invention a large prime number p is provided, and a random number r relatively prime with (p-1) is chosen, and r'=1/r mod (p-1) is computed, and the output w has the form $b^{a(x)}$ mod p, and a(x) is a secret cryptographic function, and $G(x, r)=(x, b^r \bmod p)$, and $F(x')=u^{a(x)}$ mod p, where x'=(x, u), and $H(y', r)=y'^{r'}$ mod p.

Moreover in accordance with a preferred embodiment of the present invention b is a generator of all of 1 . . . p-1.

Further in accordance with a preferred embodiment of the present invention b is a generator of a sub-group of 1 . . . p-1, the order of the sub-group being large and prime.

Still further in accordance with a preferred embodiment of the present invention the order of the sub-group is greater than $2^{120}$.

Additionally in accordance with a preferred embodiment of the present invention the order of the sub-group is greater than $2^{160}$.

Moreover in accordance with a preferred embodiment of the present invention the computation unit includes a secure computation unit.

Further in accordance with a preferred embodiment of the present invention the secure computation unit includes a removable security element. Still further in accordance with a preferred embodiment of the present invention the removable security element includes a smart card.

BRIEF DESCRIPTION OF THE DRAWINGS

The present invention will be understood and appreciated more fully from the following detailed description, taken in conjunction with the drawings in which:

FIG. 2 is a simplified flowchart illustration of a preferred method of operation of the system of FIG. 1.

DETAILED DESCRIPTION OF A PREFERRED EMBODIMENT

Figure 1:
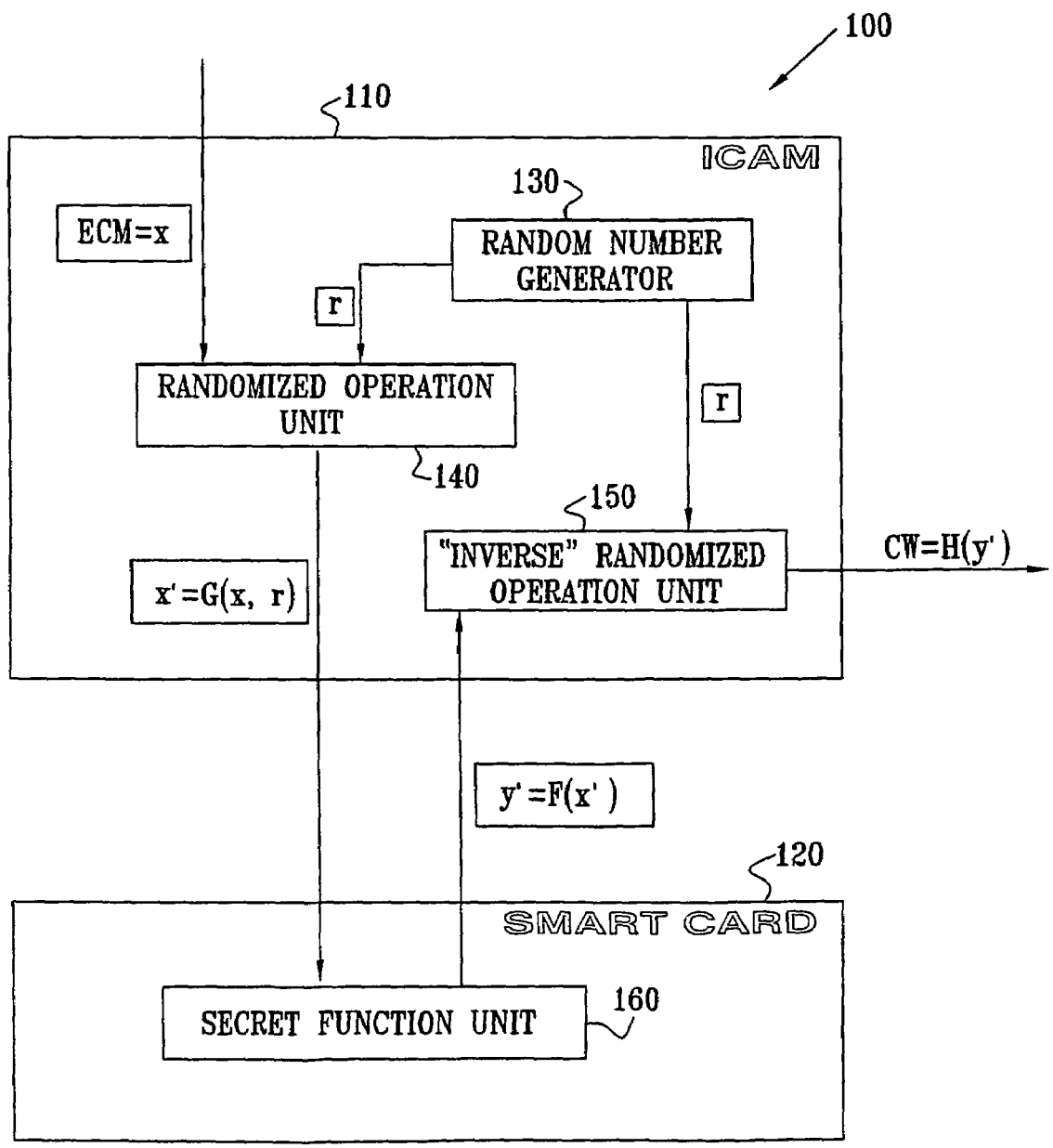
FIG. 1 is a simplified block diagram illustration of a system for preventing unauthorized access to secure communications, constructed and operative in accordance with a preferred embodiment of the present invention.

As explained above, in the present specification the example of a broadcast system is used by way of example only, it being appreciated that the prior art system of Nachman et al, described above, as well as the present invention may be used in other appropriate types of communication systems. In general, the present invention, in preferred embodiments thereof, can be used to protect secured communications which are restricted in scope, in the sense that not any possible message can be protected; rather, as will be appreciated from the discussion below, messages that can be protected in preferred embodiments of the present invention generally fall within particular categories governed by mathematical equations.

More specifically and without limiting the generality of the foregoing, the present invention is described herein in terms of a preferred embodiment in which an ICAM (Integrated Conditional Access Module), typically comprised in a set top box (STB), is in communication with a security element such as a smart card.

The present invention, in the context of a preferred embodiment relating to the case of an STB and a smart card, may be briefly summarized as follows:

1. The ICAM receives the ECM and performs a randomized cryptographic operation thereon.

2. The processed ECM is sent to the smart card.

3. The smart card operates the smart card's one-way function (as is well known in the art and described, for example, in the Cohen et al patents mentioned above) on the ECM to produce a modified CW and sends the modified CW back to the ICAM. It is appreciated, throughout the present specification, that the example of using a one-way function is believed to be preferred, but that other methods known in the art may also be used.

4. The ICAM performs an "inverse" operation (in a sense, inverse to the randomized cryptographic operation previously performed by the ICAM on the ECM) on the modified CW to obtain the actual CW.

Reference is now made to FIG. 1, which is a simplified block diagram illustration of a system for preventing unauthorized access to secure communications, constructed and operative in accordance with a preferred embodiment of the present invention. The system of FIG. 1, generally designated 100, preferably comprises an ICAM 110, which is in operative communication with a smart card 120. The ICAM 110 is typically comprised in a set top box (not shown).

It is appreciated that the smart card 120 is described by way of example only; any appropriate secure computation unit, preferably but not necessarily comprising a removable security element may be used; the smart card 120 is a preferred example of a removable security element.

The ICAM 110 and the smart card 120 are preferably implemented in hardware, as is well known in the art. The ICAM 110 and the smart card 120 may communicate via any appropriate interface; preferably, a standard interface, as is well known in the art, may be used.

The ICAM 110 preferably comprises a random number generator 130, preferably comprising a secure random number generator, as is well known in the art; alternatively, a pseudo random number generator may be used. The term "secure random number generator" is used, throughout the present specification and claims, to refer to any appropriate random number generator generally believed by persons skilled in the art to be secure, it being appreciated that it may not be possible to prove that a random number generator is secure.

The ICAM 110 also preferably comprises a randomized operation unit 140 and an "inverse" randomized operation unit 150. Preferred modes of operation of the randomized operation unit 140 and of the "inverse" randomized operation unit 150 are described below.

The smart card 120 preferably comprises a secret function unit 160. As is well known in the art, the secret function unit 160 is operative to perform a secret cryptographic function on its input, typically comprising an ECM, and to return its output, typically comprising a CW, to the ICAM 110. It is appreciated that, as is well known in the art and is described, for example, in U.S. Pat. Nos. 5,282,249 and 5,481,609 to Cohen et al and in U.S. Pat. No. 6,178,242 to Tsuria, referred to and incorporated by reference above, the smart card 120 preferably also comprises other components and is preferably operative to allow the secret function unit 160 to return the CW only if properly authorized, as described above.

A preferred mode of operation of the apparatus of FIG. 1 is now briefly described; it is appreciated that the following description is given by way of example only, and is not meant to be limiting.

Let x be an input ECM, typically received from broadcast, from a recording, or from any other appropriate source. Let r be a random number chosen by the random number generator 130 in the ICAM 110. The random number generator 130 preferably sends r to the randomized operation unit 140 and to the "inverse" randomized operation unit 150.

The randomized operation unit 140 in the ICAM 110 performs the operation $x'=G(x, r)$ and sends $x'$ to the smart card 120.

The secret function unit 160 in the smart card 160 preferably operates, using the smart card's one way function, for example, on $x'$. The secret function unit 160 in the smart card 110 preferably performs the operation $y'=F(x')$ and sends $y'$ to the ICAM. (This preferred mode of operation is in contrast to the prior art, in which the ECM x is passed to a prior art smart card and the prior art smart card returns the CW.)

The "inverse" randomized operation unit 150 in the ICAM 110 preferably performs $CW=H(y', r)$.

Note that the result $H(F(G(x, r)), r)$ must not depend on r; the functions G, F, and H, and possibly also the permissible values of the CW and/or of x, must be chosen such that this is true.

It is appreciated that the CW, as is well known in the art, may be used to unscramble a scrambled message; equivalently, the CW may function as a decryption key for decrypting an encrypted message. Descrambling and/or decryption may take place in any appropriate descrambling/decryption unit (not shown), as is well known in the art.

The following is a particular example and is not meant to limit the generality of the present invention. In the following example, particular choices of G, F, and H are given, along with associated permissible values of the CW.

Let $CW=b^{a(x)} \bmod p$, where:

p is a large prime (as is well known in the art of cryptography);

a(x) is an appropriate secret cryptographic function, as is well known in the art; and b is a generator of a "large enough" sub-group of the elements 1 ... p-1; two preferred cases of "large enough" are:

1) b is a generator of all of 1 ... p-1; and
2) b is a generator of a sub-group of 1 ... p-1, the order of which sub-group is large (such as, for example, greater than $2^{160}$) and prime. It is appreciated that b itself need not necessarily be large; in some cases a value of 2 or 3 for b may be appropriate. It is further appreciated that p-1 should preferably not have many small divisors, to prevent easy cryptanalysis.

The ICAM 110 receives x. The random number generator 130 in the ICAM 110 secretly chooses random r relatively prime with (p-1). The randomized operation unit 140 in the ICAM 110 computes $b^r \bmod p$ and sends $x'=(x, b^r \bmod p)$ to the smart card 120. The smart card 120 receives $x'$, and the secret function unit 160 in the smart card 120 computes $y'=(b^r)^{a(x)} \bmod p = b^{r\, a(x)} \bmod p$; this result is sent back to the ICAM 110.

The "inverse" randomized operation unit 150 in the ICAM 110 computes the CW by raising the result received from the smart card 120 to the power r', such that $b^{rr'}=1 \bmod p$, thus producing the $CW=y'^{r'}=b^{a(x)} \bmod p$. It is appreciated that, since the "inverse" randomized operation unit 150 in the ICAM 110 knows r, the "inverse" randomized operation unit 150 is able to find r' with $r'=1/r \bmod (p-1)$.

In this particular example, $G(x, r)=(x, b^r \bmod p)$, $F(x')=u^{a(x)} \bmod p$, where $x'=(x, u)$, and $H(y', r)=y'^{r'} \bmod p$, where $r'=1/r \bmod p-1$.

The security of this method, like that of many other contemporary cryptographic methods, depends on the intractability of the discrete logarithm problem, since an opponent would need to take the logarithm of $b^{a(x)}$ or $b^r \bmod p$ in order to break the scheme using cryptographic techniques.

The following observations apply to the above discussion:

a(x) may be any appropriate cryptographic function, which is kept secret.

The same r may be reused for multiple CWs.

It is appreciated that the above describes one example only, and that a person skilled in the art could substitute another appropriate group structure, such as elliptic curve operations, for modular exponentiation.

The following are believed to comprise some of the important features and positive results achieved by the present invention:

1. The equipment receiving the CW, such as the ICAM 110 or the STB (not shown) in which the ICAM 110 is typically comprised, does not need to be serialized or to have any identity for being authenticated by the smart card 120; rather, it needs a secure random number generator such as the random number generator 130.

2. The CW is computed as a composition of three function is $H(F(G(x, r)), r)$, where r is a secure random chosen by the recipient of the CW. The security of the scheme is based on:

Unfeasibility of deriving r out of x and G(x, r).
Unfeasibility of computing $F(x_1)$ out of $x_1$, $x_2$, $F(x_2)$.

3. If, additionally, it is unfeasible to derive r out of y and H(y, r), the computation performance may be improved by reusing the same r for multiple CWs.

4. Any appropriate group with a computationally secure discrete logarithm problem, together with any generic secret function a(x) can be used for construction of the functions H, F, G as follows:

$$G(x, r) = x, g^r$$

$$F(x, u) = u^{a(x)}$$

$$H(y, r) = y^{1/r \bmod \text{order of the group}}$$

In this example g is a fixed generator of the group and r is a large secret random integer relatively prime with the order of the group. The term "computationally secure" is well known in the art and is defined, for example: in *Applied Cryptography*, referred to above and incorporated herein by reference, at page 8; and in *Handbook of Applied Cryptography*, referred to above and incorporated herein by reference, at page 43.

Reference is now made to FIG. 2, which is a simplified flowchart illustration of a preferred method of operation of the system of FIG. 1. The method of FIG. 2 is self-explanatory with reference to the above discussion of FIG. 1, except as described below.

In step 210, in which functions G, F, and H are chosen, it is appreciated that, as described above, functions G, F, and H are chosen such that the output w computed in step 230 does not depend on the value of r chosen in step 220.

It is further appreciated that, in preferred embodiments of the present invention, the choice of functions G, F, and H in step 210 is made "once and for all", before, during or after production of devices which implement the method of FIG. 2; for example, and without limiting the generality of the foregoing, G, F, and H may be downloaded to such a device after production thereof, or may be "built in" during production thereof. By contrast, the choice of r in step 220 is made "at run time", when devices which implement the method of FIG. 2 are used, as described more fully above with reference to FIG. 1.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for producing an output from an input encoding the output, the method comprising:
choosing functions G, F, and H;
at an Integrated Conditional Access Module (ICAM), performing the following:
providing an input x;
choosing a random number r, using at least one of a random number generator and a pseudo-random number generator;
computing x'=G(x, r); and
sending x' to a computation unit;
at the computation unit, performing the following:
computing, in the computation unit, y'=F(x'); and
sending y' to the ICAM;
computing, in the ICAM, the output w =H(y', r); and
utilizing w as at least one of: a control word and a decryption key, wherein G, F, and H are chosen such that w is not dependent on the choice of r.

2. The method according to claim 1 and further comprising:
utilizing the output to decrypt an encrypted message.

3. The method according to claim 1 and wherein F comprises a secret function.

4. The method according to claim 1 and wherein the random number generator comprises a secure random number generator.

5. The method according to claim 1 and wherein the function G is chosen such that derivation of r from x and G(r, x) is computationally unfeasible.

6. The method according to claim 1 and wherein the function F is chosen such that, for two inputs $x_1$ and $x_2$, it is computationally unfeasible to compute $F(x_1)$ from $x_1$, $x_2$, and $F(x_2)$.

7. The method according to claim 1 and also comprising choosing a group having a computationally hard discrete logarithm problem, and wherein:

$$G(x, r) = x, g^r, \text{ and}$$

$$F(x, u) = u^{a(x)}, \text{ and}$$

$$H(y, r) = y^{1/r \bmod \text{order of the group}}, \text{ and}$$

a(x) is a secret cryptographic function, and
g is a fixed generator of the group, and
r is a large secret random integer relatively prime with the order of the group.

8. The method according to claim 1 and also comprising:
providing a large prime number p;
choosing a random number r relatively prime with (p-1); and
computing r'=1/r mod (p-1), and wherein:
the output w has the form $b^{a(x)}$ mod p, and
a(x) is a secret cryptographic function, and $$G(x, r) = (x, b^r \bmod p), \text{ and}$$

$$F(x') = u^{a(x)} \bmod p, \text{ where } x' = (x, u), \text{ and}$$

$$H(y', r) = y'^{r'} \bmod p.$$

9. The method according to claim 8 and wherein b is a generator of all of 1 . . . p-1.

10. The method according to claim 8 and wherein b is a generator of a sub-group of 1 . . . p-1, the order of said sub-group being large and prime.

11. The method according to claim 10 and wherein the order of said sub-group is greater than $2^{120}$.

12. The method according to claim 10 and wherein the order of said sub-group is greater than $2^{160}$.

13. The method according to claim 1 and wherein the computation unit comprises a secure computation unit.

14. The method according to claim 13 and wherein the secure computation unit comprises a removable security element.

15. The method according to claim 14 and wherein the removable security element comprises a smart card.

16. A secure system for producing an output from an input x encoding the output, the system comprising:

an Integrated Conditional Access Module (ICAM), the ICAM comprising:
  a random number generator choosing a random number r;
  a randomized operation unit computing x'=G(x, r); and
  an "inverse" randomized operation unit; and
a computation unit receiving x' and computing y'=F(x'), wherein
the "inverse" randomized operation unit receives y' from the computation unit and computes the output w =H(y', r), and
G, F, and H are functions chosen such that w is not dependent on the choice of r.

17. The system according to claim 16 and wherein the random number generator, the randomized operation unit, and the "inverse" randomized operation unit are comprised in an output-production subsystem, and
  the computation unit is adapted for use with more than one said output-production system, and
  the computation unit is not operable to distinguish between one output-production subsystem and another output-production subsystem.

18. The system according to claim 16 and wherein the random number generator, the randomized operation unit, and the "inverse" randomized operation unit are comprised in an output-production subsystem, and
  the computation unit is adapted for use with more than one said output-production system, and
  the computation unit is not operable to determine, based solely on communication with the output-production subsystem, whether the output-production subsystem is entitled to receive output from the computation unit.

19. The system according to claim 16 and wherein the output comprises one of the following: a control word (CW); and a decryption key.

20. The system according to claim 19 and further comprising:
  a utilization unit utilizing the output to decrypt an encrypted message.

21. The system according to claim 16 and wherein F comprises a secret function.

22. The system according to claim 16 and wherein the random number generator comprises a secure random number generator.

23. The system according to claim 16 and wherein the random number generator comprises a pseudo-random number generator.

24. The system according to claim 16 and wherein the function G is chosen such that derivation of r from x and G(r, x) is computationally unfeasible.

25. The system according to claim 16 and wherein the function F is chosen such that, for two inputs $x_1$ and $x_2$, it is computationally unfeasible to compute $F(x_1)$ from $x_1$, $x_2$, and $F(x_2)$.

26. The system according to claim 16 and wherein a group having a computationally hard discrete logarithm problem is chosen, and $G(x, r)=x,g^r$, and $F(x, u)=u^{a(x)}$, and $H(y, r)=y^{1/r \bmod \text{order of the group}}$, and a(x) is a secret cryptographic function, and
g is a fixed generator of the group, and
r is a large secret random integer relatively prime with the order of the group.

27. The system according to claims 16 and wherein a large prime number p is provided, and
  a random number r relatively prime with (p-1) is chosen, and
  r'=1/r mod (p-1) is computed, and
  the output w has the form $b^{a(x)}$ mod p, and
  a(x) is a secret cryptographic function, and $G(x, r)=(x, b^{r'} \bmod p)$, and $F(x')=u^{a(x)} \bmod p$, where $x'=(x, u)$, and $H(y', r)=y'^r \bmod p$.

28. The system according to claim 27 and wherein b is a generator of all of 1 . . . p-1.

29. The system according to claim 27 and wherein b is a generator of a sub-group of 1 . . . p-1, the order of said sub-group being large and prime.

30. The system according to claim 29 and wherein the order of said sub-group is greater than $2^{120}$.

31. The system according to claim 29 and wherein the order of said sub-group is greater than $2^{160}$.

32. The system according to claim 16 and wherein the computation unit comprises a secure computation unit.

33. The system according to claim 32 and wherein the secure computation unit comprises a removable security element.

34. The system according to claim 33 and wherein the removable security element comprises a smart card.

35. A secure system for producing an output from an input x encoding the output, the system comprising:
  an Integrated Conditional Access Module (ICAM), the ICAM comprising:
    a random number generator choosing a random number r;
    a randomized operation unit computing x'=G(x, r);
    an interface adapted to communicate with a computation unit external to the secure system, the computation unit receiving x' and computing y'=F(x'); and
    an "inverse" randomized operation unit; wherein
  the "inverse" randomized operation unit receiving y' from the computation unit and computing the output w=H(y', r), and
  G, F, and H are functions chosen such that w is not dependent on the choice of r.

36. The system according to claim 35 and wherein the random number generator, the randomized operation unit, and the "inverse" randomized operation unit are comprised in an output-production subsystem, and
  the computation unit is adapted for use with more than one said output-production system, and
  the computation unit is not operable to distinguish between one output-production subsystem and another output-production subsystem.

37. The system according to claim 35 and wherein the random number generator, the randomized operation unit, and the "inverse" randomized operation unit are comprised in an output-production subsystem, and
  the computation unit is adapted for use with more than one said output-production system, and
  the computation unit is not operable to determine, based solely on communication with the output-production subsystem, whether the output-production subsystem is entitled to receive output from the computation unit.

38. The system according to claim 35 and wherein the output comprises one of the following: a control word (CW); and a decryption key.

39. The system according to claim 38 and further comprising:
   a utilization unit utilizing the output to decrypt an encrypted message.

40. The system according to claim 35 and wherein F comprises a secret function.

41. The system according to claim 35 and wherein the random number generator comprises a secure random number generator.

42. The system according to claim 35 and wherein the random number generator comprises a pseudo-random number generator.

43. The system according to claim 35 and wherein the function G is chosen such that derivation of r from x and G(r, x) is computationally unfeasible.

44. The system according to claim 35 and wherein the function F is chosen such that, for two inputs $x_1$ and $x_2$, it is computationally unfeasible to compute $F(x_1)$ from $x_1$, $x_2$, and $F(x_2)$.

45. The system according to claim 35 and wherein a group having a computationally hard discrete logarithm problem is chosen, and $G(x, r) = x, g^r$, and $F(x, u) = u^{a(x)}$, and $H(y, r) = y^{1/r \bmod \text{order of the group}}$, and a(x) is a secret cryptographic function, and
g is a fixed generator of the group, and
r is a large secret random integer relatively prime with the order of the group.

46. The system according to claim 35 and wherein a large prime number p is provided, and
   a random number r relatively prime with (p-1) is chosen, and
   r'=1/r mod (p-1) is computed, and
   the output w has the form $b^{a(x)} \bmod p$, and
   a(x) is a secret cryptographic function, and $G(x, r) = (x, b^r \bmod p)$, and $F(x') = u^{a(x)} \bmod p$, where $x' = (x, u)$, and $H(y', r) = y'^{r'} \bmod p$.

47. The system according to claim 46 and wherein b is a generator of all of 1 ... p-1.

48. The system according to claim 46 and wherein b is a generator of a sub-group of 1 ... p-1, the order of said sub-group being large and prime.

49. The system according to claim 48 and wherein the order of said sub-group is greater than $2^{120}$.

50. The system according to claim 48 and wherein the order of said sub-group is greater than $2^{160}$.

51. The system according to claim 35 and wherein the computation unit comprises a secure computation unit.

52. The system according to claim 51 and wherein the secure computation unit comprises a removable security element.

53. The system according to claim 52 and wherein the removable security element comprises a smart card.

* * * * *